Figure 1:
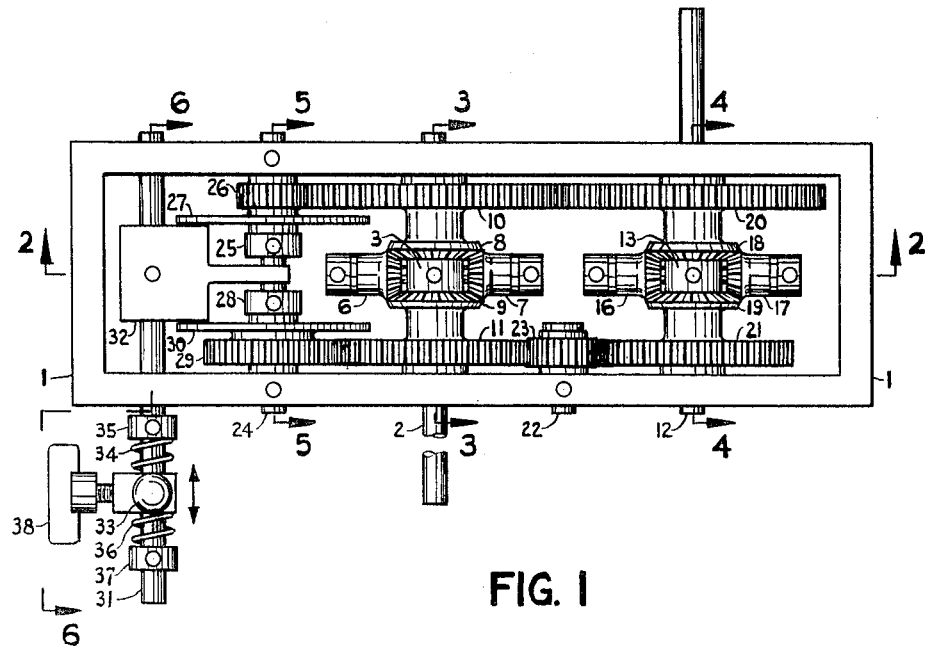

March 29, 1966  M. M. JOHNSON  3,242,769
POWER TRANSMISSION DEVICE
Filed Feb. 25, 1964  2 Sheets-Sheet 1

INVENTOR.
MARTIN M. JOHNSON
BY
ATTORNEY

March 29, 1966   M. M. JOHNSON   3,242,769
POWER TRANSMISSION DEVICE
Filed Feb. 25, 1964   2 Sheets-Sheet 2

INVENTOR.
MARTIN M. JOHNSON
BY
ATTORNEY

United States Patent Office 3,242,769
Patented Mar. 29, 1966

3,242,769
POWER TRANSMISSION DEVICE
Martin M. Johnson, 819 NE. 17th Terrace,
Fort Lauderdale, Fla.
Filed Feb. 25, 1964, Ser. No. 347,225
1 Claim. (Cl. 74—682)

This invention relates to a variable gear mechanism in which a power take-off shaft can be rotated at various speeds in either the same direction of rotation as that of the driven power input shaft or oppositely thereto.

It is an object of the invention to provide a gear mechanism of this character which will be of simple, reliable construction and be capable of many uses, such as for example, for automotive purposes.

It is an object of the invention to provide a gear mechanism that is based upon the principle that in a differential gear device the total velocities of the two gears at the right and left sides of and meshing with the differential pinions remain constant for any particular velocity at which the pinions rotate about the axis of the two gears. If the gear on one side of the differential pinions is slowed down, then the gear on the opposite side of the pinions will be proportionately speeded up.

In the structure of the present invention, two differential devices are used, one on the power input shaft and the other on the power take-off shaft, and they are connected together by gearing on both sides of the differential devices. The gear on one side hereinafter called the left side of the power input shaft differential device meshes directly with the gear on the corresponding side of the power take-off shaft differential device so that they rotate in opposite directions. The gear on the other side hereinafter called the right side of the power input shaft differential device meshes with an idler pinion and it in turn meshes with the gear on the corresponding side of the power take-off shaft differential device so that the two gears rotate in the same direction.

If power is applied to the power input shaft so that the differential pinions in the differential device on that shaft are caused to rotate, those pinions cause the two gears at the sides of the differential to rotate at the same rate of speed as that of the shaft. The rotating gears being connected with the gears at the sides of the power take-off shaft differential device cause the latter gears to rotate also but in opposite directions from each other. The oppositely rotating gears will rotate at the same velocity provided the gears are suitably proportioned. Then the differential pinions on the power take-off shaft will be rotated about their own axes only and will not rotate around the power take-off shaft and therefore that shaft will not be rotated. This is the neutral condition.

If by some means such as by applied friction the gear on the left side of the power input differential device, for example, is caused to slow down, then the gear on the right side will be speeded up proportionately. As a consequence the gear on the left side of the power take-off differential device will be slowed down and the gear on the right side will be speeded up but in the opposite direction of rotation. It follows that if the two gears at the sides of the power take-off differential device are caused to rotate at different speeds in opposite directions, the differential pinions and with them the power take-off shaft to which they are attached, will be forced to rotate in the direction of the faster side. In this example where the gears on the left side are slowed down, the power take-off shaft will rotate in the same direction as that of the power input shaft. For rotation of the power take-off shaft in the opposite direction the gears on the right side would be slowed down.

With these and other objects to be hereinafter set forth in view, I have devised the arrangement of parts to be described and more particularly pointed out in the claim appended hereto.

Figure 2:
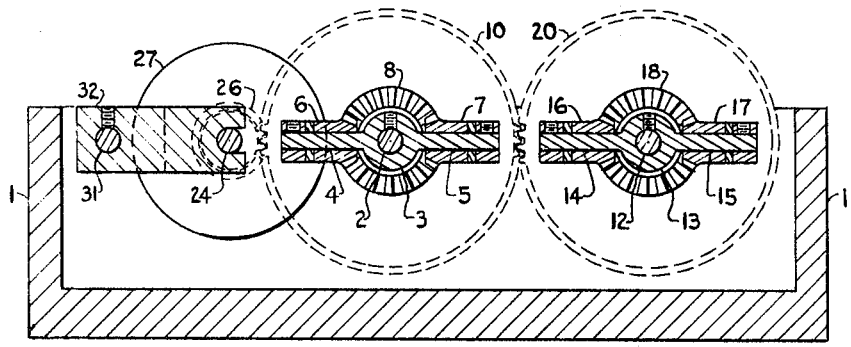
Figure 3:
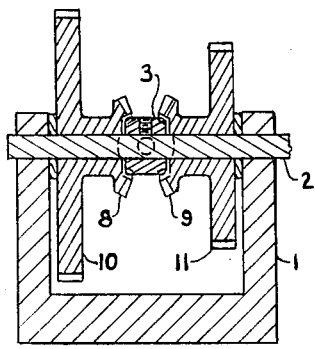
Figure 4:
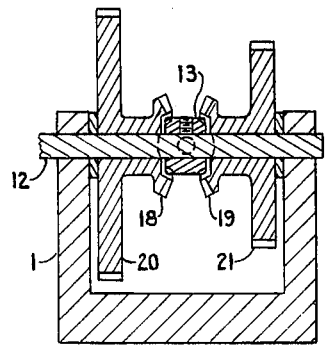
Figure 5:
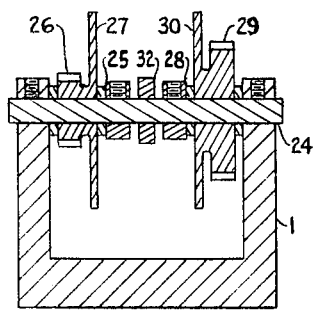
Figure 6:
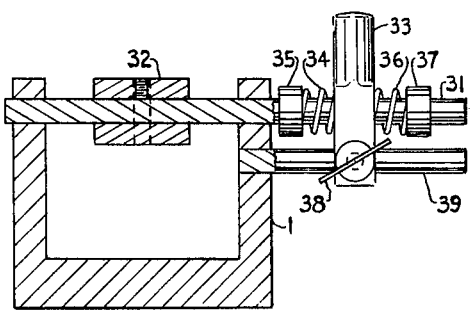

In the accompanying drawings, wherein an illustrative embodiment of the invention is disclosed, FIG. 1 is a top plan view of a variable gear mechanism constructed according to the invention, FIG. 2 is a sectional view, taken substantially on the line 2—2 of FIG. 1, looking in the direction of the arrows, FIG. 3 is a sectional view, taken substantially on the line 3—3 of FIG. 1, looking in the direction of the arrows, FIG. 4 is a sectional view, taken substantially on the line 4—4 of FIG. 1, looking in the direction of the arrows, FIG. 5 is a sectional view, taken substantially on the line 5—5 of FIG. 1, looking in the direction of the arrows, FIG. 6 is a sectional view, taken substantially on the line 6—6 of FIG. 1, looking in the direction of the arrows.

The improved gearing arrangement to which the present invention has reference, is mounted in a suitable housing 1, which may be enclosed, if desired.

Extending transversely of the housing 1 and mounted in suitable bearings provided in the opposite side walls thereof, is the power input shaft 2 that is rotatively driven by any suitable driving means according to the installation and use to which the gearing is put.

To the power input shaft 2 is attached a collar 3 provided with diametrically opposed radial stud shafts 4 and 5 on which are rotatively mounted bevel pinions 6 and 7 respectively. The number of stud shafts and bevel pinions may be increased, if desired.

Free to rotate on the power input shaft 2 are bevel gears 8 and 9, which mesh with bevel pinions 6 and 7. Bevel gear 8 is integral with spur gear 10 and bevel gear 9 is integral with spur gear 11 as shown in FIG. 3.

The collar 3 with stud shafts 4 and 5 together with bevel pinions 6 and 7 and bevel gears 8 and 9 constitute a differential gear.

Extending transversely of the housing 1 and mounted in suitable bearings provided in the opposite side walls thereof, is the power take-off shaft 12.

To the power take-off shaft is attached a collar 13 provided with diametrically opposed radial stud shafts 14 and 15 on which are rotatively mounted bevel pinions 16 and 17 respectively. The number of stud shafts and bevel pinions may be increased, if desired.

Free to rotate on the power take-off shaft 12 are bevel gears 18 and 19, which mesh with bevel pinions 16 and 17. Bevel gear 18 is integral with spur gear 20 and bevel gear 19 is integral with spur gear 21 as shown in FIG. 4.

The collar 13 with stud shafts 14 and 15 together with bevel pinions 16 and 17 and bevel gears 18 and 19 constitute a differential gear.

Spur gear 20 meshes with spur gear 10, as shown in FIGS. 1 and 2.

Suitably secured in one side of the housing 1 is a stud shaft 22 upon which is rotatively mounted an idler pinion 23, which meshes with spur gears 11 and 21 as shown in FIG. 1.

Extending transversely of the housing 1, mounted in the opposite side walls thereof and securely held in place to keep from turning is the control gear shaft 24 as shown in FIGS. 1 and 5.

Free to rotate on the control gear shaft 24, held laterally in place by collar 25 and meshing with spur gear 10 is spur gear 26, which is integral with friction disk 27, as shown in FIG. 5. Also free to rotate on the control gear shaft 24, held laterally in place by collar 28 and meshing with spur gear 11 is spur gear 29, which is integral with friction disk 30, as shown in FIG. 5.

Extending transversely of the housing 1 and free to slide laterally is manipulating shaft 31 as shown in FIGS. 1 and 6.

Securely attached to the manipulating shaft 31 is friction block 32, which is so proportioned that it fits between friction disks 27 and 30 without rubbing against them when the gear mechanism is in neutral condition but which may be pushed against friction disk 27 with variable manipulating force or pulled against friction disk 30 also with variable manipulating force. Manipulating force is applied through the manipulating shaft 31 by moving laterally the manipulating knob 33, which is free to move on the shaft. The manipulating knob 33 is provided with a thumb screw 38 as shown in FIGS. 1 and 6. Force is transmitted from the manipulating knob 33 to the manipulating shaft 31 through spring 34 and collar 35 and through spring 36 and collar 37. Directly below the manipulating shaft 31 as shown in FIG. 6, is holding shaft 39 set firmly in the outside of the casing, which permits the manipulating knob to be set in any desired position by screwing in the thumb screw 38.

From the foregoing, the construction operation, control and manipulation of the variable gear mechanism should be readily understood.

To cause the power take-off shaft 12 to be rotated in the same direction as that of the power input shaft 2, it is only necessary to push the manipulating knob 33 toward the mechanism. This will cause friction block 32 to come in contact with friction disk 27 and slow it down. This in turn will slow down gears 26, 10 and 20 and will cause gears 29, 11, 23 and 21 to speed up. This slow down of gear 20 and speed up of gear 21 will cause the power take-off differential pinions and power take-off shaft to rotate in the same direction as the faster gear 21, that is, in the same direction as the power input shaft. To increase the speed of the power take-off shaft it is only necessary to increase the force on the manipulating knob 33 and so increase the friction on the friction disk.

To cause the power take-off shaft 12 to be rotated in the opposite direction from that of the power input shaft it is only necessary to pull the manipulating knob 33 away from the mechanism. This will cause gear 21 to slow down and gear 20 to speed up and the power take-off shaft will then rotate in the direction of the faster gear 20, that is, in the opposite direction to that of the power input shaft.

At this point is should be noted that whereas the control of this mechanism depends upon the application of friction to the friction disks that friction is reduced to a negligible value by having the disks rotate at relatively high speed so that even slight pressure on a disk by the friction block is sufficient to create enough drag on the disk to control the speed of the mechanism.

While I have herein shown a certain arrangement of the elements of the present invention, it will be apparent that modifications can be made without departing from the spirit of the invention. For example, while the rotating friction members are shown as disks they could have some other form. Also, while the disclosed mechanism shows the friction disks as being rotated by the gearing at the power input shaft, they could be rotated by the gearing at the power take-off shaft instead. Also, while the differential gear on the power input shaft is shown as being driven by differential pinions mounted on stud shafts on a collar carried by the power input shaft, other methods of driving the differential gear may be utilized. Also, while gear 10 is shown the same size as gear 20 and gear 11 the same size as gear 21, these gears may differ in size to give different gear ratios.

Therefore, while I have herein shown and described a single embodiment of my invention, it is obvious that the same is not to be restricted thereto, but is broad enough to cover all structures coming within the scope of the annexed claim.

One advantage of this mechanism over others is that it provides variable rotational speeds by simple mechanical means. No liquid component, electric component or other operating medium is used in its makeup.

Another advantage is that the mechanism is capable of being made in a wide range of sizes from very large to very small.

Another advantage is its versatility as to varying its forward and reverse speed limits by simple gear ratio changes.

Another advantage is that this mechanism is a self-contained power brake. In operation any change of speed of the power take-off shaft from full speed forward through full stop to full speed in reverse is forcibly accomplished by the power supplied at the power input shaft. The more power that is applied, the more effective will be the brake. If the mechanism were used where variable power and speed is available at the power input shaft such as is the case in an automobile, for example, the power brake could be very effective.

What I claim is:

A variable gearing mechanism comprising a power input shaft, a power take-off shaft, a differential gearing device on each of the shafts, gearing coupling the differential devices, means for applying drag on the gears on either side of the differential pinions in the differential gearing device on the power input shaft to thereby cause the same through said gearing to rotate the power take-off shaft at variable speeds in either the same direction as that of the power input shaft or in the opposite direction, the said drag applying means consisting of a friction block, two friction disks controlling the drag on the gearing at the two sides of the differential device, and means for selectively forcing the friction block against either friction disk.

References Cited by the Examiner

UNITED STATES PATENTS

| | | | |
|---|---|---|---|
| 1,299,629 | 4/1919 | Snider | 74—793 |
| 2,462,846 | 3/1949 | Clark. | |
| 2,480,032 | 8/1949 | Kochis | 74—682 |
| 2,973,669 | 3/1961 | Quigley | 74—682 X |

DAVID J. WILLIAMOWSKY, *Primary Examiner.*

L. H. GERIN, *Assistant Examiner.*